(12) United States Patent
Huang et al.

(10) Patent No.: US 6,931,475 B2
(45) Date of Patent: Aug. 16, 2005

(54) BLADE SERVER SYSTEM WITH KVM SWITCHES

(75) Inventors: Jen-Shuen Huang, Pateh (TW); Cheng-Hsiang Wu, Taoyuan (TW)

(73) Assignee: Quanta Computer Inc., Tao Yuan Shien (TW)

( * ) Notice: Subject to any disclaimer, the term of this patent is extended or adjusted under 35 U.S.C. 154(b) by 338 days.

(21) Appl. No.: 10/295,888

(22) Filed: Nov. 18, 2002

(65) Prior Publication Data

US 2004/0098532 A1 May 20, 2004

(51) Int. Cl.$^7$ .......................... G06F 13/00; G06F 13/14
(52) U.S. Cl. ...................... 710/316; 710/305; 361/683
(58) Field of Search .......................... 710/1, 300, 305, 710/316; 709/201, 223, 227; 712/29, 208; 370/908; 361/683, 686, 727, 752

(56) References Cited

U.S. PATENT DOCUMENTS

| | | | | |
|---|---|---|---|---|
| 5,813,014 | A | * | 9/1998 | Gustman ................. 707/103 R |
| 6,665,179 | B2 | * | 12/2003 | Chou ......................... 361/687 |
| 6,762,932 | B2 | * | 7/2004 | Regimbal et al. ........... 361/683 |
| 6,807,056 | B2 | * | 10/2004 | Kondo et al. ............... 361/689 |

OTHER PUBLICATIONS

"Advanced module packing method" by Salmom, P.C. (abstract only) Publication Date: Mar. 24–26, 2003.*
Internet Press Release from Amphus, "Tatung Ships New 800 Mhz 2U Blade Server With Integrated Gigabit Ethernet Switches and ManageSite Software"; Aug. 5, 2002. http://www.amphus.com/news/press_release.asp?id=26;
TUD–2016 Ultra–Dense Blade Server, Tatung Science & Technology, Inc., Fremont, CA 94639, 5 pages.

* cited by examiner

Primary Examiner—Gopal C. Ray
(74) Attorney, Agent, or Firm—Rabin & Berdo, P.C.

(57) ABSTRACT

A blade server system with integrated KVM switches is described. The blade server system has a chassis, a management board, a plurality of blade servers, and an output port. Each of the blade servers has a decoder and a switch. Each of the blade servers further has a select button and a processor. The decoder receives an encoded data from the management board and decodes the encoded data into command information when one of the blade servers is selected. The switch receives the command information and is switched according to the command information. The command information indicates which switch is to be turned on and which are to be turned off. The output port connects the peripheral devices for controlling the selected blade server. The management board may determine which blade server is to be selected by the button condition, commands from the peripheral devices or a request from a network computer.

16 Claims, 2 Drawing Sheets

BLADE SERVER SYSTEM WITH KVM SWITCHES

FIELD OF THE INVENTION

The present invention relates to a blade server system and especially to a blade server system with integrated KVM (Keyboard, Video monitor and Mouse) switches.

BACKGROUND OF THE INVENTION

The increasing growth of personal computers and networks allows people to utilize the networks to search for and provide information. Currently, network demands are more and more. Network-related enterprises need large numbers of computers and a lot of network equipment to satisfy user requests. For example, internet service providers and virtual host providers need to buy large numbers of servers to rent to users. The management and trouble shooting of these servers are becoming an important link. A larger server provider has usually thousands of servers. Conventionally, control of each of these servers requires a monitor, a keyboard and a mouse. That is, each server needs at least a monitor, a keyboard and a mouse. However, in actual use, each of these servers spends little time on the monitor, keyboard and mouse. Since the servers do not need to be controlled most of the time, they do not always need peripheral devices. Control of every server with a set of these peripheral devices would accordingly incur high operation costs and is not necessary. In addition, using so many peripheral devices also wastes space. In resolution of these problems, a KVM (Keyboard, Video monitor and Mouse) switch with a monitor, a keyboard and a mouse controls a plurality of server computers. A KVM switch can connect to a plurality of computers and switch between these computers. Therefore, the quantity of the peripheral devices can be reduced.

A blade server system is a mainstream computer server, and the blade server system further saves space. The blade server combines the hardware of the computer server, such as a processor, a memory and a network connection, into one blade server. The blade server has a higher calculation capacity and higher stability, and, in particular, occupies less space than a conventional computer server. The blade server is inserted on a chassis therein. The user can decide how many blade servers are needed and insert the same in the chassis. After the blade servers are inserted in the chassis, the server works immediately. Therefore, a plurality of blade servers can work in only one casing similar in size to one conventional server.

The blade server system needs peripheral devices, such as a keyboard, a video monitor and a mouse, to control the blade servers therein. Accordingly, an internal or an external KVM switch is used for a blade server system to reduce the quantity of the peripheral devices. The internal KVM switch may reduce the quantity of required cables, compared with an external KVM switch. But the internal KVM switch, such as a KVM switch blade, occupies a blade server socket on the chassis. Further, if the KVM switch blade is damaged, control of the whole blade server system may be lost.

SUMMARY OF THE INVENTION

The blade server system can reduce the space of the servers in the office. The KVM switch can further reduce the space of the peripheral devices for the blade server system. But if the KVM switch is damaged, the peripheral devices lose control of the whole blade server system. There is therefore a need to have a blade server system with an integrated KVM switch that can further reduce the space of the servers and eliminate the risk of KVM switch damage.

The present invention provides a blade server system with integrated KVM switches. The blade server system includes a chassis, a management board, a plurality of blade servers, and an output port. The chassis includes a plurality of blade server sockets for inserting blade servers. The management board controls the blade server system. Each of the blade servers comprises a decoder and a switch. Each of the blade servers further comprises a select button and a processor. The decoder receives encoded data from the management board and decodes the encoded data into command information to indicate which of the plurality of blade servers is a selected blade server. The command information indicates that the switch of the selected blade server be turned on and the switches of the others blade servers be turned off. The output port transmits signals between the peripheral devices and the selected blade server for the user to control the selected blade server.

The management board determines which blade server is the selected blade server by the following methods. The first method is to press the select button of one blade server, after which the processor sends information to the management board to inform the management board that the blade select button board that has been pressed is the selected blade server. The second method is to input directly from the peripheral devices to the management board. The third method is to select the blade server directly from the web user interface of the blade server system and a network computer.

Therefore, the blade server system with integrated KVM switches according to the present invention saves a blade server socket, without the KVM switch blade, to insert one more blade server and eliminates the risk of the KVM switch damage.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

Figure 1:
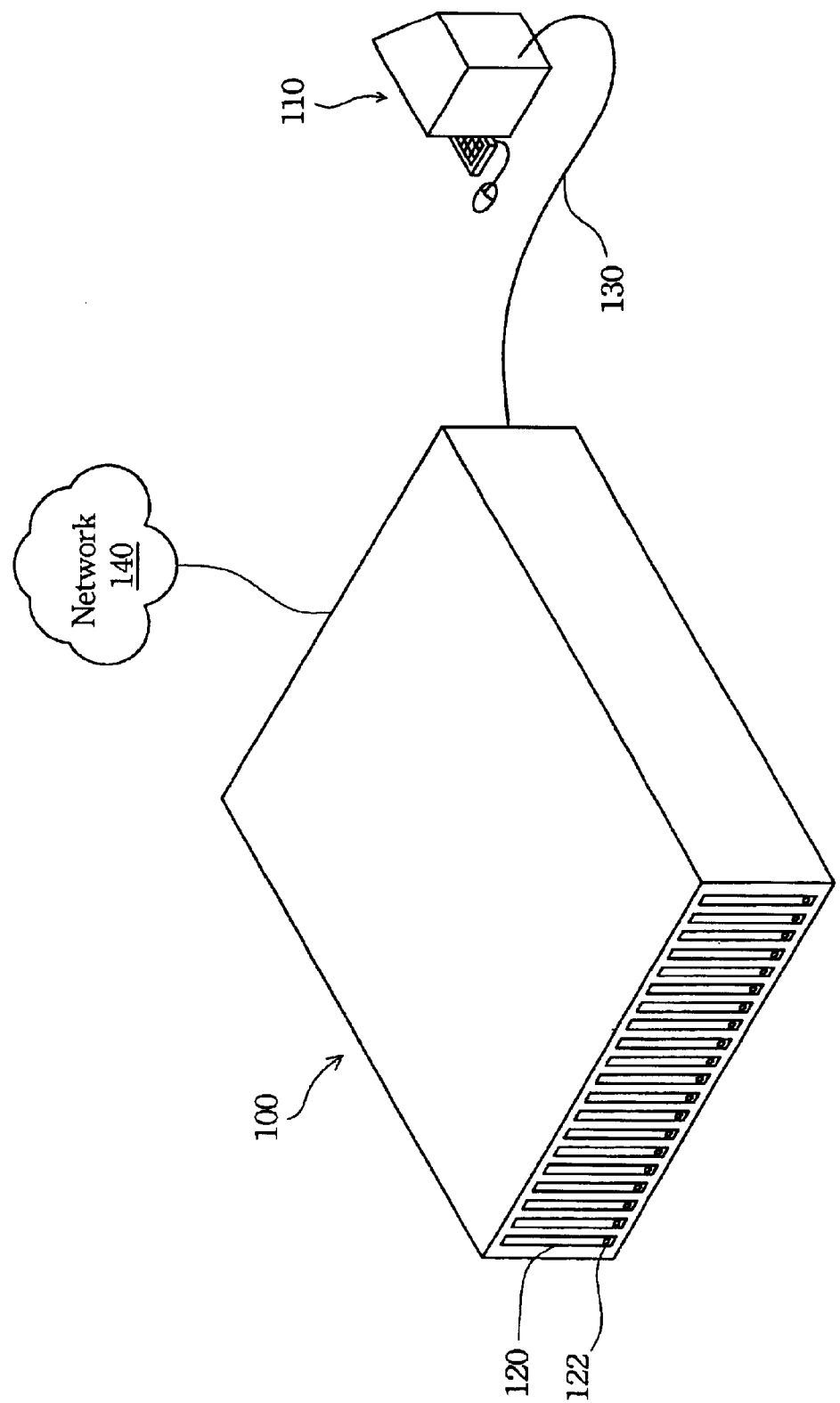
FIG. 1 is a schematic diagram of a blade server system according to the present invention connected with peripheral devices and network.
Figure 2:
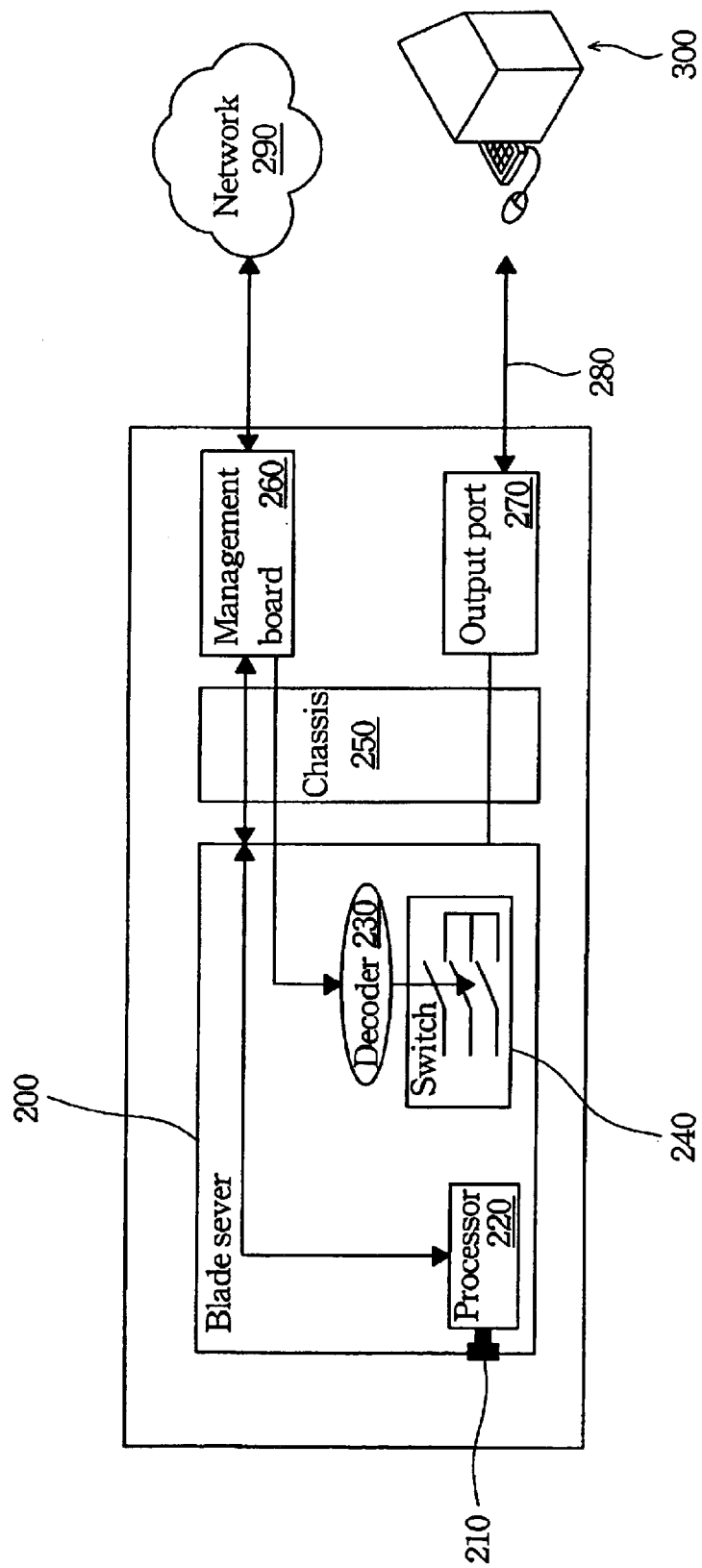
FIG. 2 is a schematic block diagram of the blade server system according to the present invention.

FIG. 1 is a schematic diagram of a blade server system 100 according to the present invention connected with peripheral devices and network. The peripheral devices include a monitor, a keyboard and a mouse. The blade server system 100 has an integrated KVM switch integrated in each blade server 120 to monitor and control the system. The blade server system 100 includes a plurality of blade servers 120 and each of the blade servers 120 has a select button 122 for selecting one of the blade servers 120 to be controlled by the peripheral devices 110 by way of a cable 130. The blade server system 100 further connects to the network 140 for monitoring and controlling the blade server system by way of internet or local area network. FIG. 2 is a schematic block diagram of the blade server system according to the present invention. The blade server system controls a plurality of blade servers 200 inserted in sockets of a chassis 250. The system includes at least one management board 260, which connects with network 290 to control the system via internet or local area network. Each blade server 200 comprises a select button 210, a processor 220, a decoder 230 and a switch 240. Each switch 240 couples with the circuits on the chassis 250 and an output port 270 connecting with the peripheral devices 300 via a cable 280. The peripheral device 300 includes a monitor, a keyboard, and a mouse.

When the system is working, the user may control any one blade server 200 of the system. After the button 210 of one blade server 200 is pressed, the processor 220 receives the signal and sends information to the management board 260 via the chassis 250. After the management board 260 receives the information, the management board sends encoded information to the blade servers 200. The decoders 230 of the blade servers 200 decode the encoded information. The decoder 230 of the blade server 200, of which button 210 is pressed and selected, requests that the switch 240 thereof be turned on, and the decoders 230 of the other blade servers 200, not selected, request that the switches 240 thereof be turned off. Therefore, the peripheral device 300 can control and monitor the selected blade server 200.

If the user wants to control and monitor another blade server 200, the user needs to press the select button 210 of a new selected blade server 200. Therefore, the original selected blade server 200 turns off the switch 240 thereof and the new selected blade server 200 turns on the switch 240 thereof. The user can accordingly control the new selected blade server 200 immediately.

The blade server 200 of the present invention can be selected by another method, in which the switch 240 is controlled directly by pressing a hot key on the peripheral device 300. If the user needs to control and monitor a new blade server 200, the user can directly command the management board 260 by a signal from the hot key of the peripheral device 300. The management board 260 requests that the switch 240 of the new selected blade server 200 turns on and the switch 240 of the original selected blade server 200 turns off. Therefore, the user may immediately change control to the new selected blade server 200.

A further control method is to select the new blade server 200 by way of the network 290. By way of the internet or local area network, the user can directly request that the management board switch to the new selected blade server 200. The user can therefore use the network 290 to control and monitor the new selected blade server 200. Hence, the user can control the blade server system according to the present invention in any part of the world by way of the internet. Because the management blade sends encoded information, including a series number for indicating the selected blade server 200, to the blade servers 200 and the blade servers 200 to decode the information by the decoders 230, the quantity of blade servers 200 can be easily expanded. The system can control any one of the blade servers 200 because the series number can be easily expanded. Accordingly, there is no limitation on the quantity of the blade servers.

The KVM switch 240 of the invention is integrated into each of the blade servers. Only one of the blade servers is out of control, if one blade server is damaged or fails. Further, since each blade server is integrated with a KVM switch, the integrated KVM switches are distributed on blade servers, which are different from the conventional concentrated KVM switch. Thus, the KVM switch blade, the blade server system according to the present invention, becomes more flexible. Not only can the quantity of blade servers be easily expanded, but also control can be exerted by diverse methods. The blade server system according to the present invention may further use wireless control, voice control, infrared control, and so on. Therefore, there is no risk of losing control of the blade servers due to failure of the KVM switch blade. As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A blade server system, comprising:

a chassis;

a management board connecting to the chassis to control the blade server system;

a plurality of blade servers inserted on in the chassis, wherein each of the blade server comprises:

a decoder connecting to the chassis to receive encoded data from the management board and decode the encoded data into command information; and an integrated switch connecting to the decoder to receive the command information, and turn on or turn off the integrated switch according to the command information; and an output port connecting with the chassis and peripheral devices to, wherein the command information indicates one of the bald servers is a selected blade server to turn on the integrated switch thereof while others of the blade servers turn off the integrated switches thereof, and wherein the output port transmits signals between the peripheral devices and the selected blade server.

2. The blade server system of claim 1, wherein each of the blade servers further comprises:

a select button; and a processor connecting to the select button and the chassis, wherein the processor sends information to the management board via the chassis to inform the management board of the selected blade server when the select button of the server board is pressed.

3. The blade server system of claim 1, wherein the peripheral devices include a monitor, a keyboard and a mouse.

4. The blade server system of claim 3, wherein one of the plurality of blade servers is selected by direct input from the peripheral devices to the management board.

5. The blade server system of claim 4, wherein a hot key is set on the keyboard, and one of the plurality of blade servers is selected by direct input from the hot key to the management board.

6. The blade server system of claim 1, wherein the management board further connects to a network computer.

7. The blade server system of claim 6, wherein one of the plurality of blade servers is selected by input from the network computer.

8. The blade server system of claim 1, wherein the command information indicates the integrated switch of the selected blade server be turned on and the integrated switches of other blade servers be turned off.

9. A blade server system, comprising:

a chassis including a plurality of sockets;

a management board connecting to the chassis to control the blade server system;

a plurality of blade servers inserted in the sockets, wherein each of the blade servers comprises:

a processor connecting to the chassis;

a decoder connecting to the chassis to receive encoded data from the management board and decode the encoded data command information; and an integrated switch connecting to the decoder to receive the command information, and turn on or turn off the integrated switch according to the command information; and an output port connecting with the chassis and peripheral devices, wherein the command information indicates one of the blade servers is a selected blade server to turn on the integrated switch thereof while others of the blade servers turn off the integrated switches thereof, and wherein the output port transmits signals between the peripheral devices and the selected blade server.

10. The blade server system of claim 9, wherein the blade server further comprises a select button.

11. The blade server system of claim 10, wherein the processor sends information to the management board via the chassis to inform the management board of the selected blade server when the select button of the server board is pressed.

12. The blade server system of claim 9, wherein the peripheral devices include a monitor, a keyboard and a mouse.

13. The blade server system of claim 12, wherein one of the plurality of blade servers is selected by direct input from the peripheral devices to the management board.

14. The blade server system of claim 13, wherein a hot key is set on the keyboard, and one of the plurality of blade servers is selected by direct input from the hot key to the management board.

15. The blade server system of claim 9, wherein the management board further connects to a network computer.

16. The blade server system of claim 15, wherein one of the plurality of blade servers is selected by input from the network computer.

* * * * *